(12) United States Patent
Pleiman et al.

(10) Patent No.: US 12,293,446 B2
(45) Date of Patent: *May 6, 2025

(54) MACHINE LEARNING AVATAR FOR CONSOLIDATING AND PRESENTING DATA IN VIRTUAL ENVIRONMENTS

(71) Applicant: DISH Network L.L.C., Englewood, CO (US)

(72) Inventors: Eric Pleiman, Centennial, CO (US); Jesus Flores Guerra, Denver, CO (US)

(73) Assignee: DISH Network L.L.C., Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/418,075

(22) Filed: Jan. 19, 2024

(65) Prior Publication Data

US 2024/0153191 A1    May 9, 2024

Related U.S. Application Data

(63) Continuation of application No. 17/809,177, filed on Jun. 27, 2022, now Pat. No. 11,935,174.

(51) Int. Cl.
*G06T 15/00* (2011.01)
*G06K 7/14* (2006.01)
*G06Q 10/1093* (2023.01)

(52) U.S. Cl.
CPC ............ *G06T 15/00* (2013.01); *G06K 7/1417* (2013.01); *G06Q 10/1095* (2013.01)

(58) Field of Classification Search
None
See application file for complete search history.

(56) References Cited

U.S. PATENT DOCUMENTS

| | | |
|---|---|---|
| 2010/0028846 A1 | 2/2010 | Cohen et al. |
| 2012/0078097 A1 | 3/2012 | Wang et al. |
| 2021/0035563 A1 | 2/2021 | Cartwright et al. |

*Primary Examiner* — Robert J Craddock
(74) *Attorney, Agent, or Firm* — KW Law, LLP

(57) ABSTRACT

Processes, systems, and devices generate a training set comprising a first presentation having a first visual aid and a first audio description. The first visual aid and the first audio description are based on initial data retrieved from a first data source using a first indexing technique. The machine-learning system is trained using the first presentation and the initial data retrieved from the first data source using the first indexing technique. The machine-learning system generates a second presentation having a second visual aid and a second audio description. The second visual aid and the second audio description are based on refreshed data retrieved from the first data source using the first indexing technique. The machine-learning system presents the second presentation via an avatar in a virtual meeting room. The avatar is generated by the machine-learning system to present the second visual aid and the second audio description.

20 Claims, 3 Drawing Sheets

MACHINE LEARNING AVATAR FOR CONSOLIDATING AND PRESENTING DATA IN VIRTUAL ENVIRONMENTS

CROSS-REFERENCE TO RELATED APPLICATIONS

This application claims priority to U.S. patent application Ser. No. 17/809,177, filed on Jun. 27, 2022, and entitled "MACHINE LEARNING AVATAR FOR CONSOLIDATING AND PRESENTING DATA IN VIRTUAL ENVIRONMENTS," which is incorporated herein by reference.

TECHNICAL FIELD

The present application relates generally to presentations in virtual environments. Various embodiments may be used in connection with virtual environments, metaverses, video games, or other computer-based or computer-enhanced environments to present content created through artificial intelligence or machine learning using an avatar.

BACKGROUND

Computer-based worlds have become immersive and intertwined with the real world as technology has matured to augment reality. Many of these virtual and augmented worlds, video games, and other areas of cyberspace are intertwined to form a metaverse. For example, virtual reality (VR) products, such as the VR headset offered under the tradename Meta Quest, offer users an immersive experience in a virtual environment or metaverse through peripheral devices capable of rendering three-dimensional audio and video. Such VR devices mimic real world sensory experiences and can be used to mimic office environments.

However, humans typically are still integral to presentations given in virtual environments. People spend time reviewing, editing, and compiling spreadsheets and databases in generating and delivering repetitive presentations. People often create and present the same charts for repeating meetings or presentations so other attendees can easily digest the information delivered in a format they have encountered before. The repetitive generation of presentations can be time consuming and inefficient, whether in the context of real-world or virtual presentations.

For example, a presenter typically reviews data and selects relevant topics for inclusion in visual aids for a presentation. The presenter often creates verbal descriptions of content to support the visual aids and delivers the descriptions concurrently with their visual aids. These limitations tend to restrict presentations in virtual environments to including human-generated content. But in addition to being time consuming to generate and deliver, human-generated content can sometimes lead to a presenter making errors in delivering the verbal component of a presentation. Prerecording presentations can reduce the opportunity for introducing human error but tends to suppress the interactive nature of live presentations.

BRIEF SUMMARY

Various embodiments relate to processes, computing systems, devices, and other aspects of integrated virtual reality systems executed by a processor of a computing device to compile and present data using a machine-learning system. Processes may include the step of generating a training set comprising a first presentation having a first visual aid and a first audio description. The first visual aid and the first audio description are based on initial data retrieved from a first data source using a first indexing technique. The machine-learning system running on a host server is trained using the first presentation and the initial data retrieved from the first data source using the first indexing technique. The machine-learning system generates a second presentation having a second visual aid and a second audio description. The second visual aid and the second audio description are based on refreshed data retrieved from the first data source using the first indexing technique. The machine-learning system presents the second presentation via an avatar in a virtual meeting room. The avatar is generated by the machine-learning system to present the second visual aid and the second audio description.

Various embodiments of the machine-learning system receive an interruption from an attendee in the virtual meeting room of the virtual environment. The interruption is generated in response to an interaction with a QR code. The interruption from the attendee may also include a selection of the refreshed data. The machine-learning system in the virtual meeting room presents the first data source and the first indexing technique in response to receiving the interruption comprising the selection of the refreshed data. The virtual meeting room may be rendered by a virtual reality device.

Processes of the present disclosure may generate a third visual aid and a third audio description of the second presentation, wherein the third visual aid and the third audio description are based on data retrieved from a second data source using a second indexing technique. The first data source may be a data stream and the first indexing technique may include retrieving the data from the first data source using a tag. The first presentation may include a remediation process to resolve a category of a problem identified by an attendee input. The machine-learning system selects the remediation process based on a likelihood that the remediation process will resolve the problem identified by the attendee input. The machine-learning system can reclassify the problem into an unaddressed category and select a second remediation process for presentation based on the unaddressed category. The first presentation includes financial information from a quarterly report in some embodiments.

A device in communication data sources may compile and present data using a machine-learning system in some embodiments. The device includes a processor, a non-transitory data storage, and an interface to a network, wherein the non-transitory data storage stores computer-executable instructions that, when executed by the processor, cause the device to perform operations. The operations include generating a training set comprising a first presentation having a first visual aid and a first audio description. The machine-learning system running on a host server is trained using the first presentation and the initial data retrieved from the first data source using the first indexing technique. The first visual aid and the first audio description are based on initial data retrieved from a first data source using a first indexing technique. The operations further include generating a second presentation having a second visual aid and a second audio description. The second visual aid and the second audio description are based on refreshed data retrieved from the first data source using the first indexing technique. The operations also include presenting the second presentation in a virtual meeting room of a virtual environment. The avatar is generated by the machine-learning system to present the second visual aid and the second audio description.

Various embodiments include operations further comprising receiving an interruption from an attendee in the virtual meeting room of the virtual environment. The interruption from the attendee includes a selection of the refreshed data. A virtual reality device renders the virtual meeting room. The first data source is a data stream, and the first indexing technique uses a tag to retrieve the data from the first data source. Other devices, systems, and automated processes may be formulated in addition to those described in this brief description.

BRIEF DESCRIPTION OF THE DRAWING FIGURES

The subject matter of the present disclosure is particularly pointed out and distinctly claimed in the concluding portion of the specification. A more complete understanding of the present disclosure, however, may be obtained by referring to the detailed description and claims when considered in connection with the illustrations.

DETAILED DESCRIPTION

The following detailed description is intended to provide several examples that will illustrate the broader concepts set forth herein, but it is not intended to limit the invention or applications of the invention. Furthermore, there is no intention to be bound by any theory presented in the preceding background or the following detailed description.

Various embodiments generate presentations for delivery in virtual environments using machine learning (ML) or artificial intelligence (AI) techniques. The ML/AI systems described herein are trained with data from presentations initially generated and delivered by humans. Presentations generated and delivered by the AI/ML systems can subsequently be used for retraining by way of a feedback loop. The AI/ML engine selects data, descriptions, and visual aids for future presentations.

Suitable training sets can include file locations, data streams, tags, columns, date ranges, or other data suitable for identifying a data source and selecting the desired data from the data source. The machine generated presentations are delivered in a virtual environment by an avatar controlled by the AI/ML system. By utilizing AI and machine learning ML techniques, presentations and reports built with repetitive techniques and data can be automated with limited human intervention. Examples of suitable AI techniques to implement the systems described herein include perceptron, feed forward, multilayer perceptron, convolutional, radial basis functional, recurrent, long short-term memory, sequence to sequence, or modular neural networks. ML implementations may be supervised, semi-supervised, unsupervised, or reinforcement based and can use algorithms such as naive Bayes classifier, k means clustering, support vector, linear regression, logistic regression, neural networks described above, decision trees, random forests, or nearest neighbors.

As used herein, the term "virtual environment" means any user experience that includes display of computer-generated renditions of three-dimensional objects or computer-generated audio. Examples of virtual environments include virtual reality, augmented reality, metaverses, and other digital content that includes computer-generated visuals or audio. As used herein, terms like "first," "second," and other such numerical terms referring to structures are used as labels and typically do not imply a sequence or order unless clearly indicated by the context.

Figure 1:
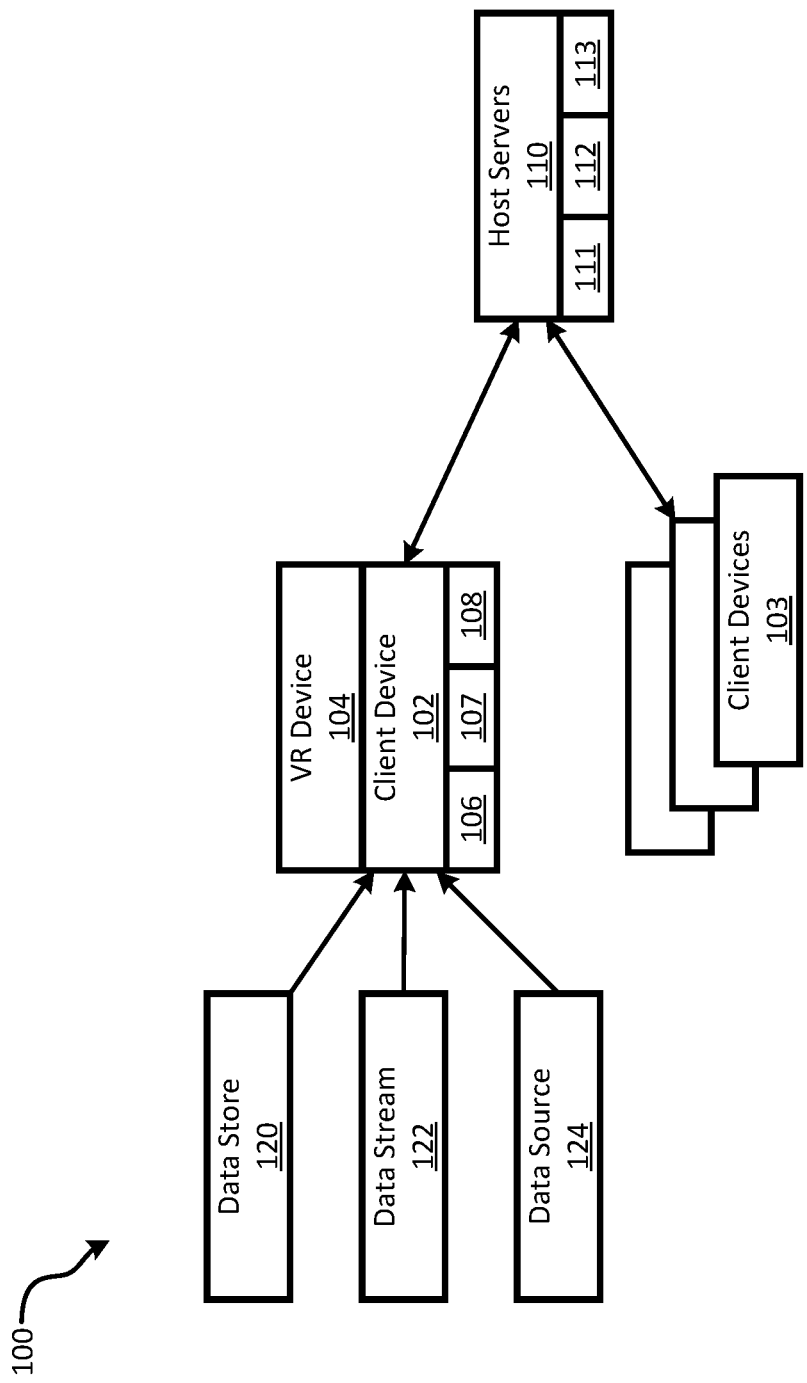
FIG. 1 illustrates an example system for generating and delivering presentations in a virtual environment.

With reference to FIG. 1, an example system 100 is shown for generating and presenting presentations using an AI/ML system, in accordance with various embodiments. Client devices 102 of system 100 include processor 106, non-transitory data storage 107, and interface 108 to a network. The non-transitory data storage is configured to store computer-executable instructions executable by the processor to render a real-world object in the virtual environment. Computing devices of example system 100 include client devices 102, VR devices 104, and host servers 110.

In various embodiments, host servers 110 are similar to client devices 102 in that they can include a processor 111, a non-transitory data storage 112, and an interface 113 to a network. Client devices 102 are in communication with host servers 110 and other client devices 103 over the network. Other client devices 103 are configured the same as or similar to client device 102. Each client device runs software to participate in the virtual environment hosted by host servers 110. Examples of client devices include laptops, tablets, smartphones, computers, integrated VR devices, or other computing devices suitable for communicating with host servers 110 over a network and participating in a virtual environment. Each client device 102 may be integrated with a VR device 104 or in communication with a VR device 104 over an electronic communication channel such as, for example, Bluetooth®, WiFi®, USB, SATA, internal bus, or other wireless or wired communication channel.

In various embodiments, VR device 104 can be any electronic device capable of visually rendering objects in a virtual environment. For example, VR device 104 may include a headset, smartphone, monitor, television, projector, or other viewing device capable of rendering one or more images containing renditions of avatars in virtual spaces. VR device 104 may be integrated with client device 102, or VR device 104 may be a peripheral device in electronic communication with client device 102.

Host servers 110 store data, code, or other content in support of a virtual environment. Host servers 110 may include one or more standalone servers, virtualized servers, distributed computing clusters, containers, networked computing devices, cloud services, or other computing device capable of communicating with client device 102 over a network. Suitable networks for hosting a virtual environment may include a wide area network (WAN) such as the Internet, a telephony network, a public or private network of any sort, a cellular network, or the like.

In various embodiments, client device 102 is in communication with data store 120, data stream 122, or other data sources 124 to access data useable for generating reports. The example embodiment of FIG. 1 depicts data store 120, data stream 122, and other data sources 124 as being in direct communication with client device 102, though in other embodiments the various data sources may be in communication with host servers 110 that support indirect access by client device 102. Data store 120, data stream 122, or other data sources 124 are typically the same as or similar to the data sources used in training sets. Although client device 102 accesses the data sources and generates AI or ML presentations in the example embodiment depicted in FIG. 1, host servers 110 or other computing devices may equivalently access the data sources and generate presentations.

Embodiments of data store 120 may be, for example, an unstructured data store, a structured data store, a big data warehouse, a relational database, a flat file, a JSON file, or any other technology suitable for storing and retrieving data based on columns, tags, references, or other indexing techniques. Data stream 122 may be a raw data stream incoming from a third-party data service, from computing devices on a network, from sensors, from a data stack, or from raw data sources. Other data sources 124 may be files, a file system, local storage, network storage, cloud storage, data retrievable through an application programming interface (API), web data, or other data retrievable from a third party.

Figure 2:
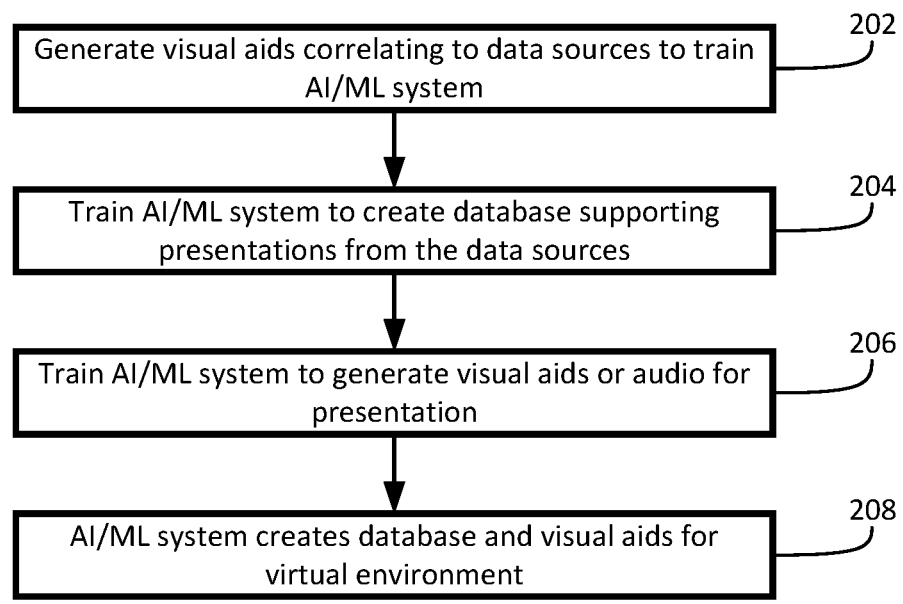
FIG. 2 illustrates an example process for generating and delivering presentations through an artificial intelligence (AI) or machine learning (ML) avatar in a virtual environment.

With reference to FIG. 2, an example process 200 is shown for presenting data compiled from data store 120, data stream 122, or other data sources 124. The compiled data is presented in a meeting room in a virtual environment using an avatar. The avatar is rendered in human form in a virtual environment based on presentation content generated by AI/ML systems running on a client device 102 or host server 110. The AI/ML systems may be trained by inputting previously presented charts, graphs, slides, visual aids, or compiled information that was used in past presentations for the same specific purpose using data that correlates with a specific data source. AI and ML techniques may also generate audio describing the data, charts, graphs, slide decks, bullet points, and other visual aids generated by the system.

Process 200 begins with generating visual aids for presentations correlating to data sources (block 202). The initial presentations may be generated and delivered without the use of AI/ML systems to create a training set. The presentations include information pulled from data sources such as data store 120, data stream 122, and other data sources 124. The information can include numbers retrieved using fields or tags to index the data, with the numbers subjected to mathematical manipulation. Information can also include textual data retrievable from data sources using table names, fields, or tags to index the data. Data can be extracted from data sources using natural language processing and analytics to identify patterns, hotspots, outliers, sentiment, or other data points of interest. The data lookup and manipulation steps may be repeatable by AI/ML systems after suitable training.

Process 200 includes training the AI/ML system to create a database to support presentations (block 204). The AI/ML system is trained via algorithms that identify location of data and instructions to compile the data into the desired form for presentation. Suitable training sets for data collection may include data source types, data source identifiers, field identifiers, field generation techniques, data update frequency, and desired outputs that were used to generate the presentations in the training set from block 202. The AI/ML systems can use the indexing techniques to access refreshed or updated data for future reports.

Process 200 includes training the AI/ML system to use the compiled data (from block 204) to generate visual aids for a presentation (block 206) in a virtual environment. For example, suitable visual aid formats for presentations may include charts, graphs, histograms, bullet lists, slide decks, heat maps, or other visual formats for displaying data in a presentation. The AI/ML system can learn how users prefer audio discussion in support of the visual aids during the presentation in response to training the AI/ML from its previous presentations. Previous presentations may be generated in block 202 described above, and presentations may be recorded and included in training sets for the AI/ML system. A feedback loop may be implemented by surveying attendees at the end of meetings to capture actionable suggestions and preferences to improve the future presentations by retraining the AI/ML system.

Process 200 includes rendering the visual aid files in a virtual environment for presentation (block 208). The AI/ML system presents the information in the virtualized environment using visual cues such as, for example, a white board, screen at the front of a meeting room, or a projection cube in the center of a table for each attendee. The meeting room can be configured in many formats such as at a round table or oval table with a projection cube in the middle. A projection cube or other multi-sided object might have four, five, six, or any number of sides so each individual at the table has their own projection of the visual aids. The meeting room may include a curved table allowing attendees sitting side-by-side to look at the same white board. A suitable meeting room in a virtual environment might comprise desks arranged similarly to a school or college classroom to reproduce an auditorium-like feel for attendees. Presentations may be delivered asynchronously to different attendees or groups of attendees, with content tailored to the attendees of each presentation based on preferences and feedback from previous presentations.

In various embodiments, the AI/ML system allows humans to present in the VR meeting room alongside the AI/ML avatar. Humans can participate using their own avatar for the meeting in the virtual environment. Human avatars may click on the different visual aids, and the AI/ML avatar might pull up source data from a database in response to the attendee input. The AI/ML avatar can visually present on the source and techniques used to gather the data, and on how the visual aids were created for human review. The human avatar has access permissions to read from the databases, charts, data stores, data streams, or other data sources that the AI/ML system used to pull source data and generate the supporting database trained in block 204. The human avatar may access the data stores by touching information in the visual aids or by looking at or scanning a QR code linked to the data source.

Human review takes place outside the virtualized environment or prior to presentation in some embodiments. For example, if a reviewer does not want to examine the AI/ML generated presentation in the virtual environment, the visual aids and the supporting database can be emailed to the reviewer. The email can include a QR code, link, or VR touch of the document allowing examination of the AI/ML generated presentation in other environments. Allowing external review enhances the virtual environment by creating a mixed universe feel to the interaction, and it enhances accuracy and reliability of the presentations generated by the AI/ML systems.

In an example, an entity has a quarterly financial call to present financial and accounting information (e.g., a 10-K report). The financial information changes but is generated in a similar manner and integrated into a presentation in a similar manner for each quarter. The AI/ML system generates the presentation and presents using an avatar in a virtual environment. Algorithms may be implemented as negative limitations that are verified, taught, and trained in the AI/ML system. Negative limitations can prevent the AI/ML system from visually or audibly presenting information that might cause liability risks for the entity during presentation of the quarterly financial call. The negative limitations may be trained based on human error that has led to increased risk during past presentations.

Figure 3:
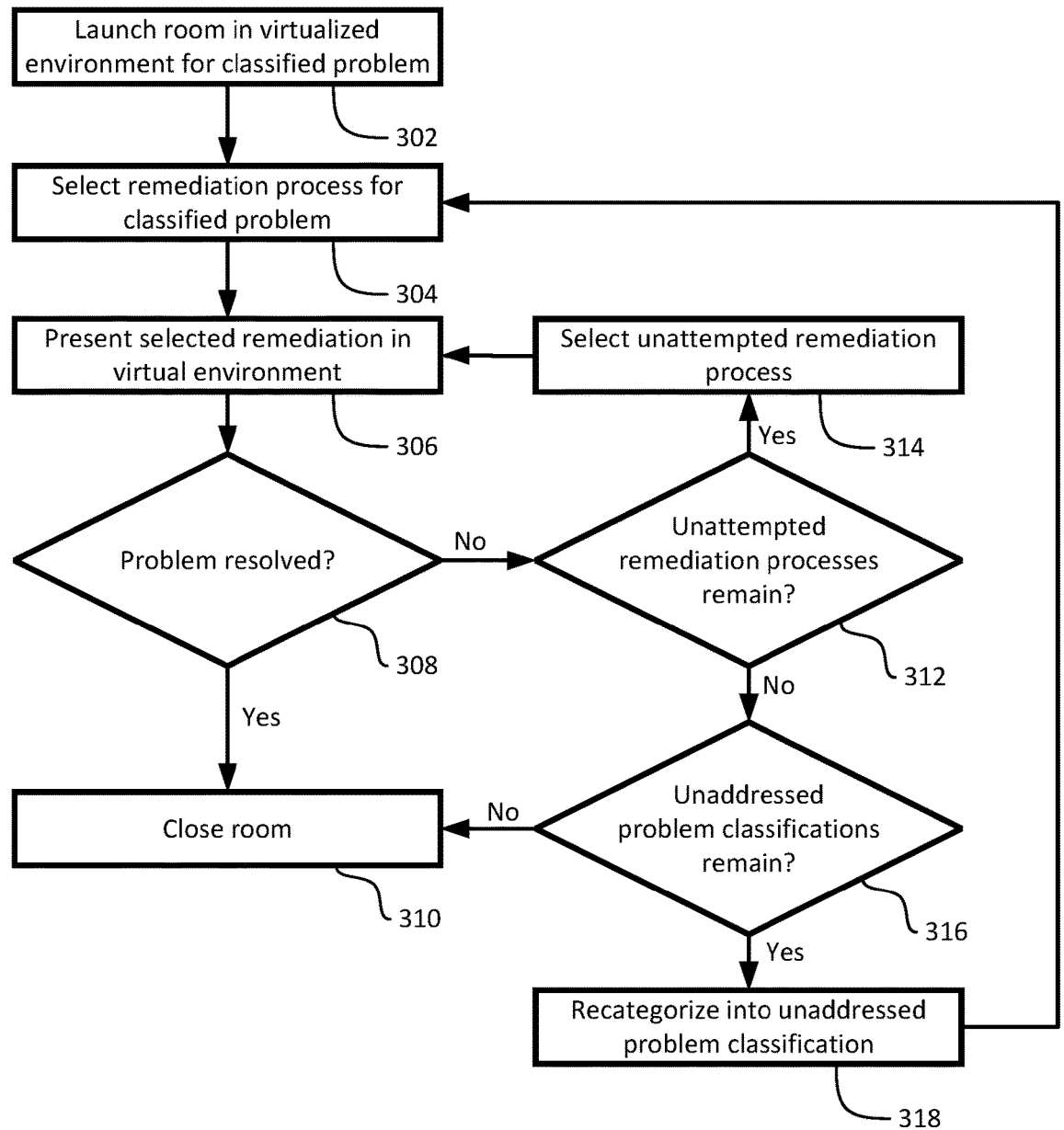
FIG. 3 illustrates an example process generating and delivering troubleshooting presentations in a virtual environment using an AI/ML avatar.

Referring now to FIG. 3, an example process 300 is shown for presenting technical troubleshooting guided by the AI/ML system in a virtual environment. Guided troubleshooting can take place in a virtual environment to help users diagnose issues with their television service, set-top box (STB), digital video recorder (DVR), cellular service, or other electronic device or system. The example of process 300 is directed to an STB issue classification protocol for the AI/ML systems described herein. The above-described AI/ML avatar may be launched in an application for troubleshooting a STB when users experience performance issues.

Embodiments of process 300 include a user requesting or otherwise launching a meeting room in the virtual environment (block 302). If a customer has an issue with their STB and has access to a VR device 104, the customer can use VR device 104 to engage a QR code, button push, press a button on a remote control, make a menu selection, or otherwise activate a meeting room in a virtual environment with an AI/ML avatar for guided troubleshooting. The user selects a problem or problem classification from a list of available problems or classifications in some embodiments, or the user can select undesirable symptoms or behavior the STB is exhibiting and the AI/ML system can classify the issue. The AI/ML system can access a database of common STB problems and a call center playbook including step-by-step processes to fix known issues. The AI/ML system walks the user through the step-by-step process to resolve the STB issues using its avatar to communicate with the customer in the virtual environment.

The AI/ML system selects a remediation process for a problem classification (block 304). The remediation process may be selected based on a likelihood of success for a known device experiencing a known problem. The remediation process may also be selected from a list of techniques for a known device experiencing an unknown problem. A default list of remediation techniques can be applied in response to an unknown device or an unknown problem. The AI/ML system may remotely run a diagnostic scan of the customer's STB in some embodiments to identify the STB model or check for known issues. The remote scan results may be stored with the problem identification for later analysis and can be used to select a remediation plan in response to the scan results revealing a known problem. Remote scan results or problem identifications may be aggregated across regions, device types, demographics, recently accessed content, or other filters to detect correlation with identified problems. The AI/ML system presents the selected remediation process in the virtual environment (block 306) using the AI/ML avatar.

In an example of selecting a remediation process, a user indicates receiver Y from the field is exhibiting issue AA, for which solutions A, B, and C are known remediation processes in the database. Solution A succeeds 55% of the time, B succeeds 35% of the time, and C succeeds 10% of the time, with the success rates either entered in a training set or computed from an ongoing tally over a predetermined window of time. AI/ML system begins guiding the user through solution A by presenting the steps of solution A in the meeting room in the virtual environment in response to A having the greatest likelihood of success. If the issue is not resolved by solution A, the AI/ML system attempts the next highest success rate for the receiver and issue.

Continuing the above example, a different receiver Z from the field has the same issue AA, but the database shows solution A is successful 25% of the time, B is successful 15% of the time, and C is successful 60% of the time. In this example, the AI/ML avatar begins by presenting solution C to the user of receiver Z experiencing issue AA. If no known solution resolves the issue, the AI/ML system may reclassify the issue into a different issue or problem category then try the solutions associated with the reclassified issue.

After presentation of the selected remediation, the AI/ML system checks whether the problem was resolved (block 308). The check may be performed remotely by scanning for current operation of the STB, or by user input indicating the fix was successful, or by the user leaving the room in the virtual environment. The AI/ML system may close the room in response to determining the problem was resolved (block 310).

The AI/ML system, as it successfully guides remediation of problems, can store the number of remediation techniques attempted, the order, the success and failure counts, or other information suitable to improve the remediation process. Information relating to attempting to fix an issue may be aggregated across regions, device types, demographics, recently accessed content, or other filters to detect correlation between the issue and likely steps for a given STB or customer. AI/ML system may build an additional database associating each issue reported by a customer in association with remediation techniques applied. AI/ML system may improve resolution speeds by knowing which issue the customer has, which device the customer has, and which problem the customer is experiencing.

In response to the problem persisting, the AI/ML system may check whether unattempted remediation processes are associated with the problem classification in the database (block 312). If unattempted remediation processes remain, the AI/ML system selects the next unattempted remediation process (block 314). The process may be selected based on likelihood of success, duration to complete, a product of likelihood of success and duration to complete, or other metrics suitable for selecting a desirable remediation process from a list of remediation processes. The system again presents the selected remediation process in the virtual environment (block 306).

In response to attempting all available remediation processes for a problem classification, AI/ML system checks whether unaddressed problem classifications remain (block 316). The unaddressed classifications typically have one or more remediation processes that were not presented during attempted resolution of the unsuccessful problem classification. If classifications remain, the AI/ML system recategorizes into an unaddressed problem classification (block 318) and selects a remediation process for the reclassified problem (block 304).

In another example, a user launches a meeting room and identifies a nonfunctional remote control as the issue. AI/ML system identifies a dead battery or a pressed wrong button on the remote as likely causes of the issue and selects corresponding remediation processes for presentation. The battery may be a more common cause, so the ML avatar first guides the user through trouble shooting for battery replacement in the virtual environment. ML avatar renders the remote normally used with the customer's set-top box and guides the user through orienting the remote with the cover exposed to the user, sliding the cover open, removing the batteries, replacing new batteries, and replacing the cover all in the virtual environment. The AI/ML system may access a passthrough camera in communication with VR device 104 to evaluate the orientation and status of the remote and batteries during the troubleshooting session. The AI/ML system can assess whether the current orientation of the remote control is sufficiently similar to the desired orientation, and the system may prompt the user to manipulate the remote control in response to the orientation of the remote control differing from the desired orientation. The system may similarly assess and prompt whether a user is pressing a correct button or selecting the correct menu item. If the AI/ML system were presenting a process for correcting the problem of a user pressing the wrong button, the customer could look at the remote in a particular orientation with buttons showing in response to a prompt, and the ML avatar would render the depression of the corrective buttons and assess which buttons the customer presses in response.

Various embodiments tend to reduce the need for human resources in generating and presenting repeating presentations. For example, the AI/ML system can generate and present quarterly reports (e.g., 10-k reports) rather than a CTO or CEO presenting the same information each quarter. The AI/ML avatar can present audio and visual information in a manner similar to past presentations by the executives or in a different manner as desired. Technical support is another example of repeatable presentations suitable for generation and presentation by an AI/ML avatar. For example, the AI/ML system could support three million receivers in the field when two million experience trouble connecting to broadband and 300 have black screens. The support process with AI/ML avatar is more scalable than one reliant on a person to communicate information to the customer.

Presentation attendees can interrupt and interact with the AI/ML avatar during presentations in some embodiments. Attendees can indicate a desire to interrupt using a button, speech, or a gesture, and the AI/ML system responds by acknowledging the interruption and allowing the user to interject with information or questions. The AI/ML system incorporates feedback loops by prompting users with questions related to the database or presentation. A host or human presenter can take over for the AI/ML system at any time. AI/ML systems described herein tend to automate data collection and presentation by forming a database of salient information and visual aids with an AI/ML avatar accessing the database to present data in a virtual environment.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions.

The scope of the invention is accordingly to be limited by nothing other than the appended claims, in which reference to an element in the singular is not intended to mean "one and only one" unless explicitly so stated, but rather "one or more." Moreover, where a phrase similar to "A, B, or C" is used in the claims, it is intended that the phrase be interpreted to mean that A alone may be present in an embodiment, B alone may be present in an embodiment, C alone may be present in an embodiment, or that any combination of the elements A, B, and C may be present in a single embodiment. For example, A and B, A and C, B and C, or A and B and C.

References to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or device that comprises a list of elements does not include only those elements but may include other elements not expressly listed or inherent to such process, method, article, or device.

The term "exemplary" is used herein to represent one example, instance, or illustration that may have any number of alternates. Any implementation described herein as "exemplary" should not necessarily be construed as preferred or advantageous over other implementations. While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of the various features described herein without departing from the scope of the claims and their legal equivalents.

What is claimed is:

1. A process comprising:
    training a machine-learning system using a training set comprising a first presentation and initial data, wherein the first presentation comprises a first visual aid and a first audio description;
    generating, by the machine-learning system, a second presentation including a second visual aid and a second audio description; and
    presenting, by the machine-learning system, the second presentation including the second visual aid and the second audio description in a meeting room.

2. The process of claim 1, further comprising receiving, by the machine-learning system, an interruption from an attendee in the meeting room.

3. The process of claim 2, wherein the interruption is generated in response to an interaction with a QR code.

4. The process of claim 2, wherein the second visual aid and the second audio description are based on refreshed data, wherein the interruption from the attendee comprises a selection of the refreshed data.

5. The process of claim 4, further comprising presenting, by the machine-learning system in the meeting room, a first data source and a first indexing technique in response to receiving the interruption comprising the selection of the refreshed data.

6. The process of claim 1, wherein the meeting room is rendered by a virtual reality device.

7. The process of claim 1, further comprising generating, by the machine-learning system, a third visual aid and a third audio description of the second presentation, wherein the second visual aid and the second audio description are based on data retrieved from a first data source, wherein the third visual aid and the third audio description are based on data retrieved from a second data source.

8. The process of claim 1, wherein a first data source used to generate the second presentation comprises a data stream, wherein a first indexing technique used to access the data stream comprises retrieving data using a tag.

9. The process of claim 1, wherein the second presentation comprises a remediation process to resolve a category of a problem identified by an attendee input.

10. The process of claim 9, further comprising selecting, by the machine-learning system, the remediation process from a plurality of remediation processes based on a likelihood that the remediation process will resolve the problem identified by the attendee input.

11. The process of claim 10, further comprising:
reclassifying, by the machine-learning system, the problem into an unaddressed category; and
selecting a second remediation process from the plurality of remediation processes for presentation.

12. The process of claim 1, wherein the second presentation comprises financial information from a quarterly report.

13. A process for comprising:
training a machine-learning system using a training set comprising a first presentation and initial data, wherein the first presentation comprises a first visual aid and a first audio description;
generating, by the machine-learning system, a second presentation including a second visual aid and a second audio description;
presenting, by the machine-learning system, the second presentation including the second visual aid and the second audio description in a meeting room; and
determining, by the machine-learning system, whether a problem was resolved in response to the second presentation.

14. The process of claim 13, wherein assessing whether the problem was resolved further comprises prompting for a user input indicating the problem was resolved.

15. The process of claim 13, further comprising selecting a third presentation for delivery in the meeting room in response to determining the problem was not resolved.

16. The process of claim 15, wherein the third presentation is selected in response to being associated with the problem.

17. A machine-learning system in communication with data sources for compiling and presenting data, the machine-learning system comprising a processor, a non-transitory data storage, and an interface to a network, wherein the non-transitory data storage stores computer-executable instructions that, when executed by the processor, cause the machine-learning system to perform operations, the operations comprising:
training the machine-learning system using a training set comprising a first presentation and initial data, wherein the first presentation comprises a first visual aid and a first audio description;
generating, by the machine-learning system, a second presentation including a second visual aid and a second audio description; and
presenting, by the machine-learning system, the second presentation including the second visual aid and the second audio description in a meeting room.

18. The machine-learning system of claim 17, wherein the operations further comprise receiving, by the machine-learning system, an interruption from an attendee in the meeting room, wherein the interruption from the attendee comprises a selection of refreshed data for inclusion in the second presentation.

19. The machine-learning system of claim 17, wherein the virtual meeting room is rendered by a virtual reality device.

20. The machine-learning system of claim 17, wherein the second presentation is generated using data from a first data source comprising a data stream, and wherein data used to generate the second presentation is retrieved from the first data source using a tag.

* * * * *